United States Patent

Humber et al.

[11] Patent Number: 5,509,307
[45] Date of Patent: Apr. 23, 1996

[54] MECHANICAL DRIVE ARRANGEMENT FOR A MEASURING SPINDLE OF A WHEEL BALANCING MACHINE

[75] Inventors: Kurt Humber, Griesheim; Uwe Moench, Bensheim, both of Germany

[73] Assignee: Hofmann Werkstatt-Technik GmbH, Brungstadt, Germany

[21] Appl. No.: 158,736

[22] Filed: Nov. 30, 1993

[51] Int. Cl.⁶ ................................................. G01M 1/16
[52] U.S. Cl. ................................................. 73/487; 73/462
[58] Field of Search ......................... 73/462, 487, 460, 73/468

[56] References Cited

U.S. PATENT DOCUMENTS

| | | | |
|---|---|---|---|
| 3,991,620 | 11/1976 | Fencl et al. | 73/462 |
| 4,423,632 | 1/1984 | Madden et al. | 73/462 |
| 4,435,982 | 3/1984 | Borner et al. | 73/462 |
| 4,489,607 | 12/1984 | Park | 73/462 |
| 4,507,964 | 4/1985 | Borner et al. | 73/462 |
| 4,576,044 | 3/1986 | Boni | 73/462 |
| 4,635,481 | 1/1987 | Curchod | 73/462 |
| 4,972,712 | 11/1990 | Monch | 73/462 |
| 5,189,912 | 3/1993 | Quinlan et al. | 73/462 |
| 5,311,777 | 5/1994 | Cunningham et al. | 73/462 |

FOREIGN PATENT DOCUMENTS

| | | |
|---|---|---|
| 2619214 | 2/1989 | France . |
| 2153095 | 8/1985 | United Kingdom . |

OTHER PUBLICATIONS

Gunter Junck, "Measuring Methods And Instruments Of Hofmann Balancing Machines", Hofmann News No. 5.

Primary Examiner—Hezron E. Williams
Assistant Examiner—Helen C. Kwok
Attorney, Agent, or Firm—Cushman Darby & Cushman

[57] ABSTRACT

A mechanical drive arrangement for a measuring spindle of a wheel balancing machine has an actuator in the form of a lever which is actuable by hand for producing a torque which is transmitted to the measuring spindle for driving same.

8 Claims, 2 Drawing Sheets

5,509,307

MECHANICAL DRIVE ARRANGEMENT FOR A MEASURING SPINDLE OF A WHEEL BALANCING MACHINE

BACKGROUND OF THE INVENTION

In one form of a wheel balancing machine having a measuring spindle for carrying a wheel which is to be balanced, the measuring spindle can be driven in rotation by a manually operated actuating means that produces a torque which is suitably transmitted to the measuring spindle. Thus, DE 40 28 335 A1 discloses a hand crank drive assembly including a hand crank, the actuation of which causes the measuring spindle to be rotated at a measuring speed that is required for carrying out an unbalance measuring operation on the wheel mounted in the machine. The unbalance measuring operation is more specifically effected after the measuring spindle and therewith the wheel has been brought up to the required rotary speed and is then freewheeling as it gradually slows down.

SUMMARY OF THE INVENTION

An object of the present invention is to provide a mechanical drive arrangement for a measuring spindle of a wheel balancing machine, which involves only a low level of structural expenditure.

Another object of the present invention is to provide a mechanical drive arrangement for a wheel balancing machine measuring spindle, which is of a simple design configuration while nonetheless ensures that the measuring spindle is driven in rotation at the appropriate speed.

Still a further object of the present invention is to provide a wheel balancing machine including a rotary spindle for carrying a wheel to be balanced, in which the spindle is driven in rotation for a measuring run by a machine component movement of which is in any case integrated into the operating procedure of the machine.

In accordance with the present invention, the foregoing and other objects are achieved by providing a mechanical drive arrangement for a measuring spindle of a wheel balancing machine, comprising an actuating means in the form of a lever adapted to be actuated by hand for the production of a torque. The torque is then transmitted to the measuring spindle for driving the same.

Preferably the lever can have a range of pivotal movement which is less than 180°, preferably between 90° and 180°.

Where the balancing machine has a wheel guard or protection hood which is pivoted into position over a wheel to be balanced, during a measuring run, the actuating lever can be suitably integrated into the guard hood. The pivotal movement with which the guard hood is pivoted into place over the motor vehicle wheel to be balanced, after the wheel has been clamped on to the measuring spindle, is utilized to produce the torque which is transmitted to the measuring spindle for driving it in rotation for subsequently effecting the unbalance measuring procedure.

A coupling means can be operatively disposed between the measuring spindle and a transmission means for transmitting the torque produced by operation of the actuating lever to the measuring spindle. The coupling means can be a shift coupling, for example, an externally actuated coupling or clutch, or an automatically operating coupling means such as a freewheel clutch. Upon pivotal movement of the lever which, as indicated above, may, for example, be integrated into the guard hood, the torque produced by that movement is transmitted to the measuring spindle by way of the transmission means which, for example, can be in the form of a rack-and-pinion drive means. When the assembly has an externally actuated clutch, the latter is disengaged or, in the case of an automatically operating coupling means such as a freewheel clutch, the measuring spindle continues to rotate in a freewheeling mode. The unbalance measuring operation itself is carried out during that phase of the rotary movement of the measuring spindle and the wheel carried thereon for balancing purposes, that is to say, while the measuring spindle with wheel is very gradually slowing down after having been brought up to the required initial rotary speed.

Measurement of the unbalance of the wheel can be effected, for example, by means of force measurement transducers which are operatively coupled to the measuring spindle to measure forces applied thereto by virtue of any unbalance of the wheel carried thereon. The transducers can be suitably connected to an evaluation assembly which operates on the basis of the measuring procedure known as the auto-tracking measuring procedure, or with digital signal analysis; in this respect attention may be directed to Hofmann news No. 5 "Messverfahren und Messgerate der Hofmann-Auswuchtmaschinen" ("Measuring methods and equipment of Hofmann balancing machines"), imprint 09.85D.

Speeds of rotation in the range of between 30 and 80 revolutions per minute are adequate for carrying out the unbalance measuring procedures as the measuring spindle freewheels and gradually slows down.

In accordance with a preferred feature of the invention, a suitable form of motion transmission means operatively disposed between the actuating lever and the measuring spindle includes a spring which is stressed by the pivotal movement of the lever, for example, upon closure of the guard hood. While the spring is being stressed, the rotary movement of the measuring spindle is prevented by means of a locking arrangement. The locking arrangement can then be released so that relief of the stress produced in the spring causes the production of a torque for driving the measuring spindle. Accordingly, in the stressed condition the spring forms a force storage means to store the force subsequently used to drive the measuring spindle. The force storage effect is provided by virtue of the preceding pivotal movement of the lever, for example, as the guard hood is moved into the position of covering the wheel to be balanced.

In another preferred feature of the invention, the spring stress relief motion of the spring representing the above-mentioned force storage means can also be transmitted to the measuring spindle by a motion transmission means in the form of a rack-and-pinion drive means, a chain transmission or a transmission involving a traction or pulling means, for example, a cable, belt or the like. The locking of the measuring spindle for beginning the unbalance measuring operation can be released electrically or mechanically.

Further objects, features and advantages of the present invention will be apparent from the following description of preferred embodiments.

DESCRIPTION OF THE PREFERRED EMBODIMENTS

Figure 1:
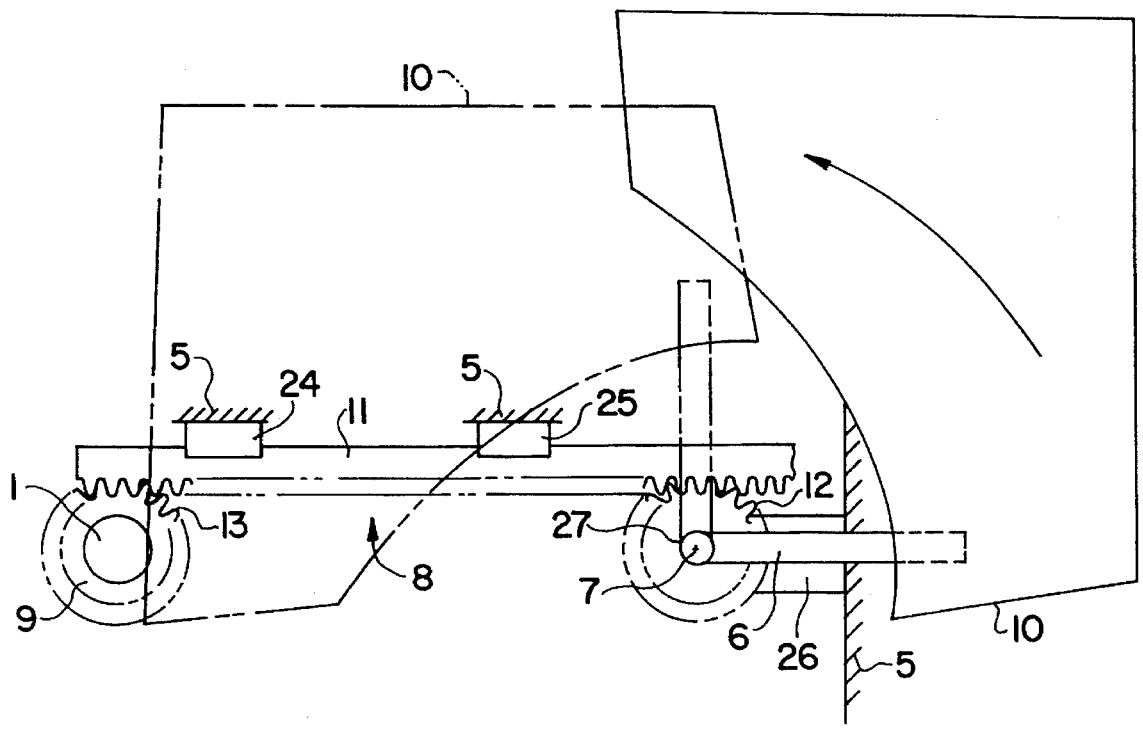
FIG. 1 is a diagrammatic front view of an embodiment of the drive arrangement according to the invention.
Figure 2:
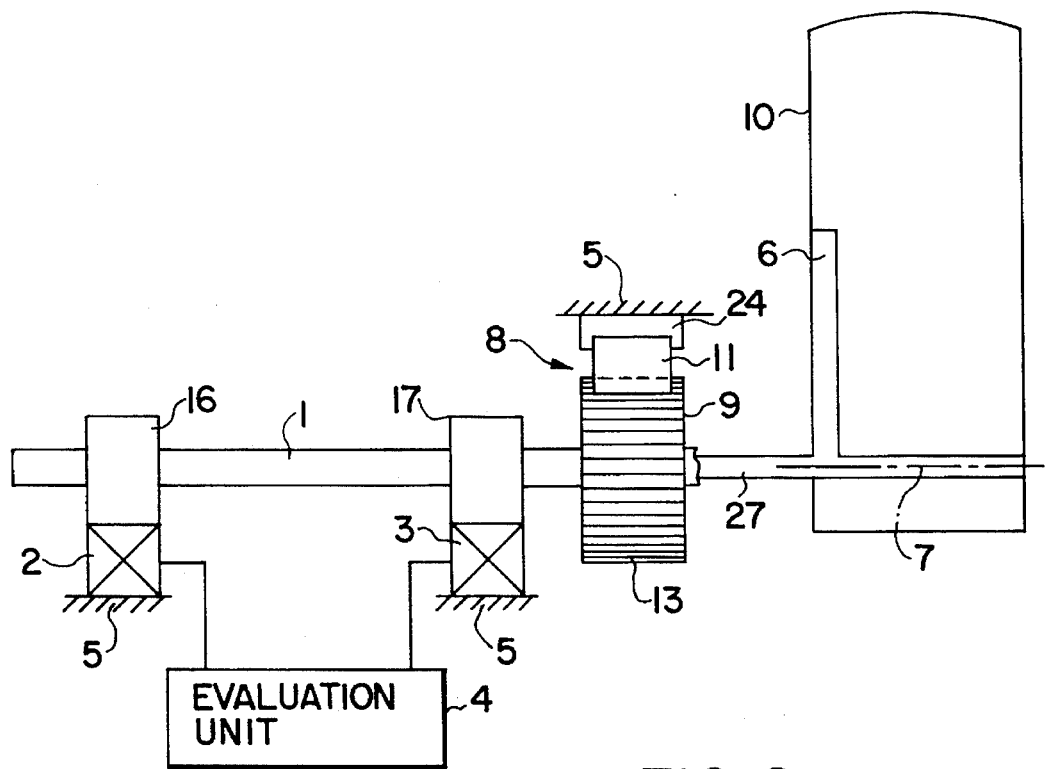
FIG. 2 is a side view of the FIG. 1 drive arrangement.

Referring firstly to FIGS. 1 and 2, shown therein in highly diagrammatic form is part of a wheel balancing machine for measuring unbalance of a wheel such as a motor vehicle wheel. Reference numeral 1 in FIGS. 1 and 2 identifies a measuring spindle for carrying a wheel to be driven in rotation for the purposes of measuring unbalance thereof, while reference numeral 5 identifies a machine frame structure. The measuring spindle 1 is mounted in the machine frame structure 5 by way of rotary bearing assemblies 16 and 17 which are in the form of rolling bearing assemblies. Disposed between the machine frame structure 5 and the bearing assemblies 16 and 17 are force measuring transducers 2 and 3 which are operatively connected by way of the bearing assemblies to the measuring spindle 1, to measure forces imparted thereto by any unbalance of the wheel carried on the measuring spindle 1. Connected to the transducers 2 and 3 is an evaluation unit as diagrammatically indicated at 4, which can be of any suitable design configuration and therefore does not need to be described in greater detail herein.

The measuring spindle 1 is driven in rotation by virtue of a pivotal movement of an actuating means in the form of an actuating lever 6. Operation of the actuating lever 6 thus drives the measuring spindle 1 in rotation at an initial rotary speed, so that measurement of the unbalance of the wheel carried on the measuring spindle can then be effected in the unbalance measuring run as the measuring spindle very gradually slows down from the initial speed of rotation.

The actuating lever 6 is mounted on the machine frame structure 5 pivotably about a shaft 7. The actuating lever 6 can also be an integral component of a wheel guard hood 10 or it can be rigidly connected to the latter. The guard hood 10 serves in the usual fashion to cover over the wheel carried on the measuring spindle 1 during the measuring run and while the wheel is rotating. In the embodiment illustrated herein, the actuating lever 6 together with the guard hood 10 is mounted on the machine frame structure 5 pivotably about the common shaft 7.

The actuating lever 6 is connected to the measuring spindle 1 by way of a motion transmission means which is generally indicated at 8, for transmitting to the measuring spindle 1 a torque which is produced upon pivotal movement of the actuating lever 6 about the shaft 7. The transmitted torque thus serves to drive the measuring spindle 1 in rotation.

Operatively disposed between the motion transmission means 8 and the measuring spindle 1 is a coupling means or clutch as generally indicated at 9, which is engaged to provide for the transmission of force from the motion transmission means 8 to the measuring spindle 1 upon pivotal movement of the actuating lever 6 for transmitting torque to the measuring spindle 1, while the coupling means or clutch 9 is disengaged from the measuring spindle 1 for the measuring run as the measuring spindle 1 progressively slows down from its initial speed.

Figure 3:
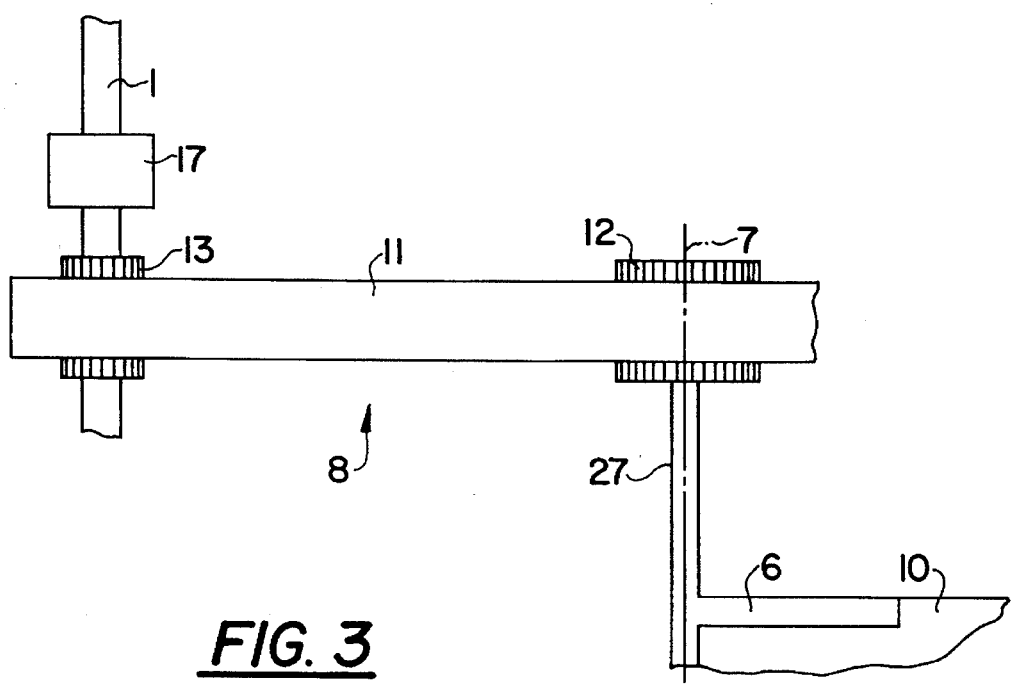
FIG. 3 is a diagrammatic view of a rack-and-pinion drive assembly which can be used as a motion transmission means in the embodiment shown in FIGS. 1 and 2.
Figure 5:
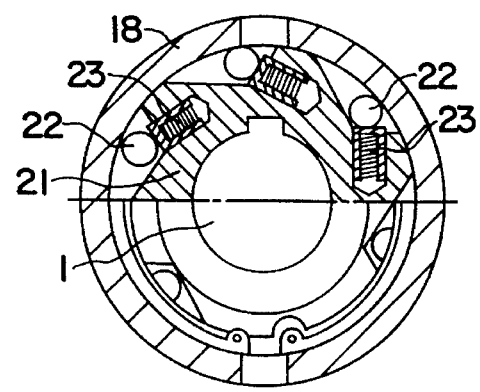
FIG. 5 shows an embodiment of a coupling means between the motion transmission means and the measuring spindle, in the form of a freewheel clutch.

Reference will now be made to FIG. 3 showing a design configuration of the motion transmission means 8, comprising a rack-and-pinion drive means. In this arrangement, a first pinion 12 is non-rotatably connected to the lever 6. The pinion 12 is connected to a second pinion 13 by way of a rack 11. In that way, the torque produced upon pivotal movement of the actuating lever 6 is transmitted from the pinion 12 to the pinion 13. The pinion 13 is connected to the measuring spindle 1 by way of the coupling means or clutch 9. As shown in FIG. 5, the coupling means or clutch 9 is in the form of a coupling means which is operated in dependence on direction of rotation, more specifically in the form of a freewheel clutch.

The torque produced by the pivotal movement of the actuating lever 6 can be transmitted with a transmission ratio, in particular step-up ratio, that is to say, the assembly has a first pinion 12 of larger diameter than the pinion 13. As already indicated above, therefore, the pinion 12 constitutes the driving pinion while the pinion 13 constitutes the driven pinion.

Figure 4:
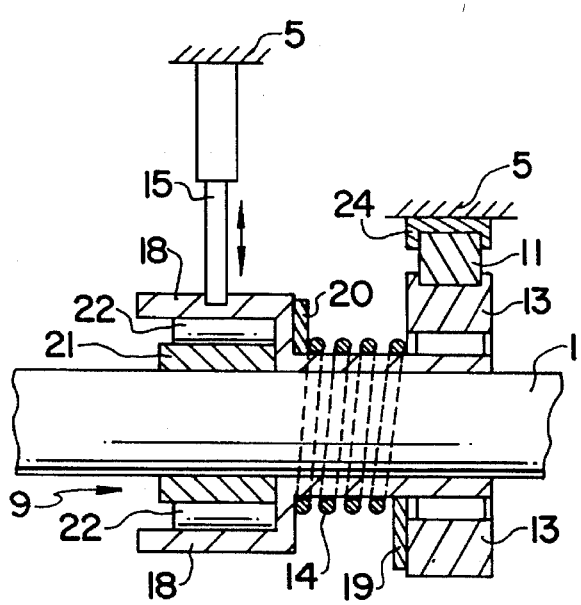
FIG. 4 is a diagrammatic view of a further embodiment of a motion transmission means having a stressable spring as a force storage means for driving the measuring spindle and which can be used in the embodiment of FIGS. 1 and 2.

Looking now at the construction shown in FIG. 4, reference numeral 14 therein denotes a spring which is operatively arranged between the pinion 13 driven by the rack 11 and an outer ring member 18 of the coupling means 9. In the illustrated embodiment the spring 14 is in the form of a wound or coil leg torsion spring which thus acts as a return tension spring or pull-back spring. The spring 14 is stressed by virtue of the drive movement of the rack 11 and the rotary movement of the pinion 13, which takes place in that situation. In the stressed condition, the spring 14 thus forms a force storage means. For that purposes, a leg 19 of the spring 14 is connected to the pinion 13 and a second leg 20 of the spring 14 is connected to the outer ring member 18 of the coupling means 9. In the construction shown in FIG. 4, transmission of the pivotal movement of the actuating lever 6 can take place with a step-down ratio, that is to say, in this construction the diameter of the pinion 12 connected to the actuating lever 6 is smaller than the diameter of the driven spindle 13.

As FIGS. 4 and 5 show, the measuring spindle 1 is non-rotatably connected to an inner ring member 21 of the coupling means 9. Spring-loaded clamping rollers 22 are operatively disposed between the inner ring member 21 and the outer ring member 18 of the coupling means 9, in the usual fashion, to provide a freewheel clutch effect. The illustrated construction has an individual spring 23 for each roller 22, as can be most clearly seen from FIG. 5.

During tensioning or tightening of the spring 14, a locking device 15 operatively engages the outer ring member 18 of the coupling means 9, to prevent it from rotating. It will be appreciated that it is also possible for the locking device 15 to engage the inner ring member 21 or directly on the measuring spindle 1. The locking device 15 can be actuated, that is to say released or moved into the locking position, in any suitable fashion, for example, manually, by means of a solenoid or mechanically.

The above-described structure operates in the following manner:

After a motor vehicle wheel (not shown) to be balanced has been clamped on to the measuring spindle 1 in the usual way, the guard hood 10 is manually pivoted from the open position shown in FIG. 1 towards the left in FIG. 1, as indicated by the arrow, into the position shown in broken line, in which it covers over the wheel to be balanced. In the illustrated embodiment that pivotal movement is over an angle of about 90°. As that pivotal movement takes place about the shaft 7, the actuating lever 6 is also pivoted about the shaft 7 over an angle of about 90° but less than 180°. The torque produced by that movement is transmitted to the second pinion 13 by way of the driving pinion 12 and the rack 11, with the structure shown in FIG. 3. The second pinion 13 is non-rotatably connected to the outer ring member 18 so that the measuring spindle 1 is already driven in rotation during closure of the guard hood 10. As already indicated above, in that situation, the transmission of torque from the actuating lever 6 to the measuring spindle 1 involves a step-up ratio so that the second pinion 13 rotates at a faster speed than the first pinion 12.

When the guard hood 10 is in the closed condition, the pinion 13 which is non-rotatably connected to the outer ring member 18 of the coupling means 9 is no longer driven and therefore stops. The directional coupling means 9 which acts as a freewheel clutch in the FIG. 5 configuration provides that, when the outer ring member 18 stops, the inner ring member 21 and the measuring spindle 1 which is non-rotatably connected thereto, continue to rotate freely, more particularly by virtue of the inertial mass of the wheel which is clamped on the measuring spindle 1. While the wheel 1 rotates freely in that way, as the measuring spindle 1 freewheels and in so doing very gradually slows down, any unbalance of the wheel is measured in the usual manner.

As already indicated above, the construction shown in FIG. 4 provides that the driven pinion 13 is separate from the outer ring member 18 of the coupling means 9, and the spring 14 is disposed between the outer ring member 18 and the pinion 13. While the pinion 13 is driven upon pivotal movement of the guard hood 10 from the opened position into the protective or closed position, the spring 14 is put under stress as the locking device 15 lockingly engages the outer ring member 18 of the coupling means 9, so that the torque produced by the actuating movement of the guard hood 10 and therewith the actuating lever 6 is prevented from being transmitted to the measuring spindle 1. When the guard hood 10 is closed, the locking device 15 is released so that the force stored in the spring 14 is transmitted to the outer ring member 18 and from there by way of the clamping rollers 22 and the inner ring member 21 to the measuring spindle 1. After the spring 14 is completely relieved of stress, the outer ring member 18 stops and the rollers 22 come out of engagement with the inner ring member 21 so that, as already indicated above, the measuring spindle 1 can then continue to rotate freely. It is during that freewheeling movement that any unbalance of the wheel on the measuring spindle 1 is measured.

It will be noted that in place of the illustrated spring 14, it is also possible to use a helical spring or a coil compression or tension spring. If a coil compression or tension spring is used, the spring is stressed in the direction of movement of the rack 11.

It will be seen therefore that, when the actuating lever 6 is pivoted together with the pivotal movement of the guard hood 10 from the opened position into the guard position in which it covers the wheel, the measuring spindle is driven by means of handling operations and movements which have to be carried out in any case to prepare for the wheel unbalance measuring operation of the machine. There is therefore no need for any additional actuating movements as would be required, for example, with a hand crank assembly.

It will be appreciated that the above-described structures have been set forth solely by way of example and illustration of the principles of the present invention and that various other modifications and alterations may be made therein without thereby departing from the spirit and scope of the present invention.

What is claimed is:

1. A mechanical drive arrangement for a wheel balancing machine comprising:

a frame;

a measuring spindle rotatably mounted with respect to said frame;

a lever pivotably mounted with respect to the frame to be movable between first and second positions for producing a driving torque; and means operatively associated with said lever and said measuring spindle for transmitting the driving torque produced by pivotal movement of said lever to said measuring spindle.

2. A drive arrangement as in claim 1 wherein said lever is manually actuable.

3. A drive arrangement as set forth in claim 1 wherein said lever has a range of pivotal movement of less than 180°.

4. A drive arrangement as set forth in claim 1 wherein said transmitting means provides an indirect drive connection between said lever and said measuring spindle, including, operatively disposed between the lever and the measuring spindle, a motion transmission means for transmitting said pivotal movement of the lever as a rotary drive movement to the measuring spindle.

5. A drive arrangement as in claim 4 wherein said transmitting means includes a releasable coupling provided on said measuring spindle to permit freewheeling rotation of said measuring spindle following the transmission of the driving torque.

6. A drive arrangement as set forth in claim 5 wherein said transmitting means comprises a rack-and-pinion drive mechanism including a first pinion coupled to said lever and a second pinion coupled to said releasable coupling.

7. A drive arrangement as set forth in claim 4 wherein the motion transmission means includes a spring mechanism adapted to be stressed by said pivotal movement of said lever, and further including a locking means, operative during spring stressing, for stopping the rotary movement of the measuring spindle.

8. A drive arrangement as in claim 1 further including a guard hood pivotable between an open position in which a wheel mounted on the measuring spindle is accessible and a closed position of at least partially covering the wheel on the measuring spindle, said lever being connected to said guard hood for pivotal movement therewith to produce said driving torque as said guard hood is pivoted towards the closed position thereof.

\* \* \* \* \*